US006613824B2

(12) United States Patent
Campbell et al.

(10) Patent No.: US 6,613,824 B2
(45) Date of Patent: Sep. 2, 2003

(54) FLAME RETARDANT RESINOUS COMPOSITIONS AND METHOD

(75) Inventors: John Robert Campbell, Clifton Park, NY (US); Thomas Miebach, Clifton Park, NY (US); Monica Marugan, Bergen op Zoom (NL); Thomas Arnold Ebeling, Evansville, IN (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/015,053

(22) Filed: Nov. 12, 2001

(65) Prior Publication Data

US 2003/0109650 A1 Jun. 12, 2003

(51) Int. Cl.$^7$ .............................. C08L 69/00; C08K 5/42
(52) U.S. Cl. ........................ 524/127; 524/130; 524/133; 524/137; 524/139; 524/140; 524/141; 524/143; 524/154; 524/165; 524/166
(58) Field of Search ................................ 524/130, 133, 524/137, 139, 140, 141, 143, 127, 154, 165, 166

(56) References Cited

U.S. PATENT DOCUMENTS

| | | |
|---|---|---|
| 3,544,514 A | 12/1970 | Schnell et al. |
| 3,635,895 A | 1/1972 | Kramer |
| 3,671,487 A | 6/1972 | Abolins |
| 3,723,373 A | 3/1973 | Lucas |
| 3,775,367 A | 11/1973 | Nouverné |
| 3,971,756 A | 7/1976 | Bialous et al. |
| 4,001,184 A | 1/1977 | Scott |
| 4,214,062 A | 7/1980 | Binsack et al. |
| 4,217,438 A | 8/1980 | Brunelle et al. |
| 4,303,575 A | 12/1981 | Reinert |
| 4,335,038 A | 6/1982 | Thomas |
| 4,579,906 A | 4/1986 | Zabrocki et al. |
| 5,132,359 A | 7/1992 | Sasaki et al. |
| 5,204,394 A | 4/1993 | Gosens et al. |
| 5,478,874 A | 12/1995 | Miyouga et al. |
| 5,521,230 A | 5/1996 | Bhatia et al. |
| 5,804,654 A | 9/1998 | Lo et al. |
| 6,133,360 A | * 10/2000 | Barren |
| 6,384,114 B1 | * 5/2002 | Nodera |

FOREIGN PATENT DOCUMENTS

| | | |
|---|---|---|
| EP | 483628 | * 5/1992 |
| WO | WO 00/06648 | 2/2000 |

OTHER PUBLICATIONS

Chemical Abstracts, vol. 96, Flame–Retardant Polycarbonates, Teijin Chemicals, Ltd. Jpn. Kokai Tokkyo Koho JP 81,127,656, p. 40, 1982.
Abstract of J06128434, J06136247, J6184421, J6306265, J6306267, J6306268.
International Search Report.

* cited by examiner

*Primary Examiner*—David J. Buttner
(74) *Attorney, Agent, or Firm*—Noreen C. Johnson; Christian G. Cabou

(57) ABSTRACT

Disclosed are flame retardant resinous compositions comprising (i) at least one aromatic polycarbonate; (ii) at least one of a second polymer having structural units derived from one or more monomers selected from the group consisting of vinyl aromatic monomers, monoethylenically unsaturated nitrile monomers, and $C_1$–$C_{12}$ alkyl (meth) acrylate monomers; (iii) at least one rubber modified graft copolymer; (iv) at least one polymeric or non-polymeric organic phosphorus species; (v) at least one antidrip agent; and (vi) at least one perfluoroalkanesulfonate salt present in an amount in a range between about 0.01 wt % and about 0.25 wt %, based on the weight of the entire composition. Also disclosed are methods for making said compositions.

56 Claims, No Drawings

FLAME RETARDANT RESINOUS COMPOSITIONS AND METHOD

BACKGROUND OF THE INVENTION

The present invention is related to flame retardant resinous compositions comprising (i) at least one aromatic polycarbonate; (ii) at least one of a second polymer having structural units derived from one or more monomers selected from the group consisting of vinyl aromatic monomers, monoethylenically unsaturated nitrile monomers, and $C_1$–$C_{12}$ alkyl (meth)acrylate monomers; and (iii) at least one rubber modified graft copolymer. In the literature different methods for improving the flame resistance of compositions comprising aromatic polycarbonate resins are described. Typically the methods use either halogenated flame retardants which are said to create potential environmental hazards or phosphate flame retardants which negatively affect the physical properties of the blends, for example by lowering the heat resistance properties. A method is needed for eliminating or reducing the amount of halogenated or phosphate flame retardants in aromatic polycarbonate-comprising compositions which results in good flame resistance without deterioration in other desirable properties.

Flame retardant polycarbonate compositions which contain certain sulfonate salts in combination with phosphates have been reported in commonly owned U.S. Pat. No. 5,204,394. However, such compositions often show poor flame resistance performance after conditioning in a humid atmosphere, which conditions may be similar to those experienced by commercial articles made from such compositions. Accordingly, there remains a need for developing flame retardant systems applicable to compositions comprising a polycarbonate.

SUMMARY OF THE INVENTION

The present inventors have discovered flame retardant resinous compositions which provide, among other beneficial properties, improved flame resistance after conditioning in a humid atmosphere. These flame retardant resinous compositions comprise:

(i) at least one aromatic polycarbonate;
(ii) at least one of a second polymer having structural units derived from one or more monomers selected from the group consisting of vinyl aromatic monomers, monoethylenically unsaturated nitrile monomers, and $C_1$–$C_{12}$ alkyl (meth)acrylate monomers;
(iii) at least one rubber modified graft copolymer;
(iv) at least one polymeric or non-polymeric organic phosphorus species;
(v) at least one antidrip agent; and
(vi) at least one perfluoroalkanesulfonate salt present in an amount in a range between about 0.01 wt % and about 0.25 wt %, based on the weight of the entire composition.

Various other features, aspects, and advantages of the present invention will become more apparent with reference to the following description and appended claims.

DETAILED DESCRIPTION

The flame retardant resinous compositions of the present invention comprise at least one aromatic polycarbonate resin. Aromatic polycarbonate resins suitable for use in the present invention comprise structural units derived from at least one dihydric phenol and a carbonate precursor. Suitable dihydric phenols include those represented by the formula (I):

HO—D—OH  (I)

wherein D comprises a divalent aromatic radical. In various embodiments D has the structure of formula (II);

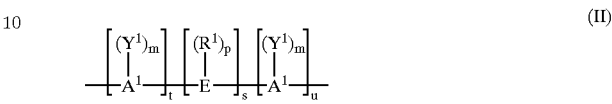

wherein $A^1$ represents an aromatic group such as phenylene, biphenylene, naphthylene, etc. In some embodiments E may be an alkylene or alkylidene group including, but not limited to, methylene, ethylene, ethylidene, propylene, propylidene, isopropylidene, butylene, butylidene, isobutylidene, amylene, amylidene, isoamylidene. When E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage including, but not limited to, sulfide, sulfoxide, sulfone; or a phosphorus-containing linkage including, but not limited to, phosphinyl, phosphonyl. In other embodiments E may be a cycloaliphatic group including, but not limited to, cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene; a sulfur-containing linkage, such as sulfide, sulfoxide or sulfone; a phosphorus-containing linkage, such as phosphinyl or phosphonyl; an ether linkage; a carbonyl group; a tertiary nitrogen group; or a silicon-containing linkage such as silane or siloxy. $R^1$ represents hydrogen or a monovalent hydrocarbon group such as alkyl, aryl, aralkyl, alkaryl, or cycloalkyl. In various embodiments a monovalent hydrocarbon group of $R^1$ may be halogen-substituted, particularly fluoro- or chloro-substituted, for example as in dichloroalkylidene. $Y^1$ may be an inorganic atom including, but not limited to, halogen (fluorine, bromine, chlorine, iodine); an inorganic group including, but not limited to, nitro; an organic group including, but not limited to, a monovalent hydrocarbon group such as alkyl, aryl, aralkyl, alkaryl, or cycloalkyl, or an oxy group such as $OR^2$, wherein $R^2$ is a monovalent hydrocarbon group such as alkyl, aryl, aralkyl, alkaryl, or cycloalkyl; it being only necessary that $Y^1$ be inert to and unaffected by the reactants and reaction conditions used to prepare a polycarbonate. In some particular embodiments $Y^1$ comprises a halo group or $C_1$–$C_6$ alkyl group. The letter "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

When more than one $Y^1$ substituent is present as represented by formula (II) above, they may be the same or different. When more than one $R^1$ substituent is present, they may be the same or different. Where "s" is zero in formula (II) and "u" is not zero, the aromatic rings are directly joined with no intervening alkylidene or other bridge. The positions of the hydroxyl groups and $Y^1$ on the aromatic residues $A^1$ can be varied in the ortho, meta, or para positions and the groupings can be in vicinal, asymmetrical or symmetrical relationship, where two or more ring carbon atoms of the aromatic residue are substituted with $Y^1$ and hydroxyl groups.

Some illustrative, non-limiting examples of dihydric phenols of formula (I) include the dihydroxy-substituted aromatic hydrocarbons disclosed by name or formula (generic or specific) in U.S. Pat. No. 4,217,438. In some embodiments of the invention dihydric phenols include 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane; 2,2-bis(4-hydroxyphenyl) propane (commonly known as bisphenol-A); 4,4-bis(4-hydroxyphenyl)heptane; 2,2-bis(4-hydroxy-3,5-dimethylphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,4'-dihydroxydiphenylmethane; bis(2-hydroxyphenyl) methane; bis(4-hydroxy-phenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl) cyclohexylmethane; 2,2-bis(4-hydroxyphenyl)-1-phenylpropane; 3,5,3',5'-tetrachloro-4,4'-dihydroxyphenyl) propane; 2,4'-dihydroxyphenyl sulfone; 2,6-dihydroxy naphthalene; 6,6'-dihydroxy-3,3,3',3'-tetramethyl-1,1'-spirobiindane (sometimes know as "SBI"); hydroquinone, resorcinol; $C_{1-3}$ alkyl-substituted resorcinols. In a particular embodiment the dihydric phenol comprises bisphenol A.

Suitable dihydric phenols also include those containing indane structural units such as represented by the formula (III), which compound is 3-(4-hydroxyphenyl)-1,1,3-trimethylindan-5-ol, and by the formula (IV), which compound is 1-(4-hydroxyphenyl)-1,3,3-trimethylindan-5-ol:

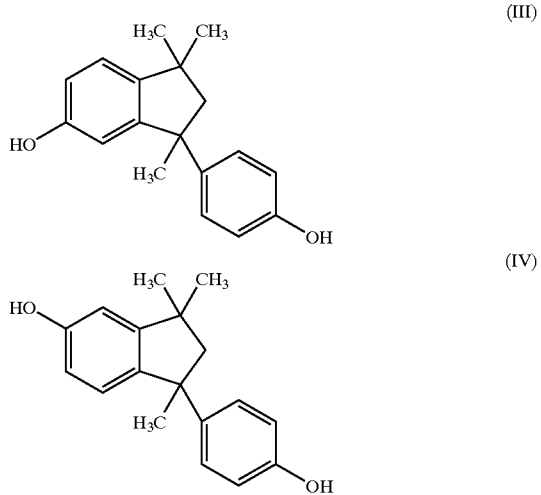

(III)

(IV)

In various embodiments the carbonate precursor for preparing polycarbonates include at least one carbonyl halide, carbonate ester or haloformate. The carbonyl halides which can be employed herein are carbonyl chloride, carbonyl bromide and mixtures thereof. Typical carbonate esters which may be employed herein include, but are not limited to, diaryl carbonates, including, but not limited to, diphenylcarbonate, di(halophenyl)carbonates, di(chlorophenyl)carbonate, di(bromophenyl)carbonate, di(trichlorophenyl)carbonate, di(tribromophenyl)carbonate; di(alkylphenyl)carbonates, di(tolyl)carbonate; di(naphthyl) carbonate, di(chloronaphthyl)carbonate, phenyl tolyl carbonate, chlorophenyl chloronaphthyl carbonate, di(methyl salicyl)carbonate, and mixtures thereof. The haloformates suitable for use herein include bishaloformates of dihydric phenols, which include, but are not limited to, bischloroformates of hydroquinone; bisphenol-A; 3-(4-hydroxyphenyl)-1,1,3-trimethylindan-5-ol; 1-(4-hydroxyphenyl)-1,3,3-trimethylindan-5-ol; 4,4'-(3,3,5-trimethylcyclo-hexylidene)diphenol; 1,1-bis(4-hydroxy-3-methylphenyl)cyclohexane, and the like; bischloroformate-terminated polycarbonate oligomers such as oligomers comprising hydroquinone, bisphenol-A, 3-(4-hydroxyphenyl)-1,1,3-trimethylindan-5-ol; 1-(4-hydroxyphenyl)-1,3,3-trimethylindan-5-ol; 4,4'-(3,3,5-trimethylcyclo-hexylidene)diphenol, 1,1-bis(4-hydroxy-3-methylphenyl)cyclohexane, or the like; and bishaloformates of glycols including, but not limited to, bishaloformates of ethylene glycol, neopentyl glycol, and polyethylene glycol. Mixtures of haloformates may be employed. In a particular embodiment carbonyl chloride, also known as phosgene, is employed. In another particular embodiment diphenylcarbonate is employed. Polycarbonate resins are made by known methods, such as, for example, interfacial polymerization, transesterification, solution polymerization or melt polymerization.

Suitable aromatic polycarbonate resins include linear aromatic polycarbonate resins and branched aromatic polycarbonate resins. Suitable linear aromatic polycarbonates resins include, for example, bisphenol A polycarbonate resin. Suitable branched polycarbonates are known and are made in various embodiments by reacting a polyfunctional aromatic compound with a dihydric phenol and a carbonate precursor to form a branched polymer, see generally, U.S. Pat. Nos. 3,544,514, 3,635,895 and 4,001,184. The polyfunctional compounds are generally aromatic and contain at least three functional groups which are carboxyl, carboxylic anhydrides, phenols, haloformates or mixtures thereof, such as, for example, 1,1,1-tri(4-hydroxyphenyl)ethane, 1,3,5,-trihydroxy-benzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic dianhydride. In some particular embodiments polyfunctional aromatic compounds are 1,1,1-tri(4-hydroxyphenyl)ethane, trimellitic anhydride or trimellitic acid or their haloformate derivatives.

In a particular embodiment the polycarbonate resin component of the present invention is a linear polycarbonate resin derived from bisphenol A and phosgene. In some particular embodiments the weight average molecular weight of the polycarbonate resin is in one embodiment from about 10,000 to about 200,000 grams per mole ("g/mol"), in another embodiment from about 20,000 to about 100,000 g/mol, in another embodiment from about 30,000 to about 80,000 g/mol, in another embodiment from about 40,000 to about 60,000 g/mol, and in still another embodiment from about 40,000 to about 50,000 g/mol, all as determined by gel permeation chromatography relative to polystyrene standards. Such resins exhibit an intrinsic viscosity in one embodiment of about 0.1 to about 1.5 deciliters per gram, in another embodiment of about 0.35 to about 0.9 deciliters per gram, in another embodiment of about 0.4 to about 0.6 deciliters per gram, and in still another embodiment of about 0.48 to about 0.54 deciliters per gram, all measured in methylene chloride at 25° C.

In a polycarbonate-containing blend there may an improvement in melt flow and/or other physical properties when one molecular weight grade of a polycarbonate is combined with a proportion of a relatively lower molecular weight grade of similar polycarbonate. Therefore, the present invention encompasses compositions comprising only one molecular weight grade of a polycarbonate and also compositions comprising two or more molecular weight grades of polycarbonate. When two or more molecular weight grades of polycarbonate are present, then the weight average molecular weight of the lowest molecular weight polycarbonate is in one embodiment about 10% to about 95%, in another embodiment about 40% to about 85%, and in still another embodiment about 60% to about 80% of the weight average molecular weight of the highest molecular weight polycarbonate. In one representative, non-limiting embodiment polycarbonate-containing blends include those comprising a polycarbonate with weight average molecular weight between about 40,000 and about 48,000 combined with a polycarbonate with weight average molecular weight between about 25,000 and about 35,000 (in all cases relative to polystyrene standards). When two or more molecular weight grades of polycarbonate are present, the weight ratios of the various molecular weight grades may range from about 1 to about 99 parts of one molecular weight grade and from about 99 to about 1 parts of any other molecular weight grades. In some embodiments a mixture of two molecular weight grades polycarbonate is employed, in which case the weight ratios of the two grades may range in one embodiment from about 99:1 to about 1:99, in another embodiment from about 80:20 to about 20:80, and in still another embodiment from about 70:30 to about 50:50. Since not all manufacturing processes for making a polycarbonate are capable of making all molecular weight grades of that constituent, the present invention encompasses compositions comprising two or more molecular weight grades of polycarbonate in which each polycarbonate is made by a different manufacturing process. In one particular embodiment the instant invention encompasses compositions comprising a polycarbonate made by an interfacial process in combination with a polycarbonate of different weight average molecular weight made by a melt process.

The amount of polycarbonate present in the compositions of the present invention is in one embodiment in a range of between about 88 wt % and about 98 wt %, and in another embodiment in a range of between about 90 wt % and about 95 wt %, based on the weight of the entire composition.

The flame retardant resinous compositions of the present invention comprise at least one of a second thermoplastic resin, which is not a polycarbonate resin. In some embodiments the second thermoplastic resin forms a second phase in the polycarbonate-comprising composition. The second thermoplastic resin comprises one or more thermoplastic polymers, and exhibits a glass transition temperature ($T_g$) in one embodiment of greater than about 25° C., in another embodiment of greater than or equal to about 90° C. and in still another embodiment of greater than or equal to about 100° C. As referred to herein, the $T_g$ of a polymer is the $T_g$ value as measured by differential scanning calorimetry (heating rate 20° C./minute, with the $T_g$ value being determined at the inflection point). In a particular embodiment the second thermoplastic resin comprises one or more polymers each having structural units derived from one or more monomers selected from the group consisting of vinyl aromatic monomers, monoethylenically unsaturated nitrile monomers, and $C_1$–$C_{12}$ alkyl (meth)acrylate monomers.

Suitable vinyl aromatic monomers comprise, e.g., styrene and substituted styrenes having one or more alkyl, alkoxyl, hydroxyl or halo substituent group attached to the aromatic ring, including, e.g., alpha-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

As used in the present context the term "monoethylenically unsaturated nitrile monomer" means an acyclic compound that comprises a single nitrile group and a single site of ethylenic unsaturation per molecule and includes, e.g., acrylonitrile, methacrylonitrile, and alpha-chloro acrylonitrile.

The terminology "(meth)acrylate monomers" refers collectively to acrylate monomers and methacrylate monomers. Suitable $C_1$–$C_{12}$ alkyl (meth)acrylate monomers comprise $C_1$–$C_{12}$ alkyl acrylate monomers, e.g., ethyl acrylate, butyl acrylate, iso-pentyl acrylate, n-hexyl acrylate, 2-ethyl hexyl acrylate, and their $C_1$–$C_{12}$ alkyl methacrylate analogs such as, e.g., methyl methacrylate, ethyl methacrylate, propyl methacrylate, isopropyl methacrylate, butyl methacrylate, hexyl methacrylate, and decyl methacrylate.

In a particular embodiment the second thermoplastic resin comprises a vinyl aromatic polymer having first structural units derived from one or more vinyl aromatic monomers, for example styrene, and having second structural units derived from one or more monoethylenically unsaturated nitrile monomers, for example acrylonitrile. The second thermoplastic resin comprises in some embodiments from about 55 to about 99 wt %, and in other embodiments from about 60 to about 90 wt %, structural units derived from styrene and in some embodiments from about 1 to about 45 wt %, and in other embodiments from about 10 to about 40 wt %, structural units derived from acrylonitrile. In a particular embodiment the weight average molecular weight of a second thermoplastic resin is from about 50,000 to about 100,000 g/mol. relative to polystyrene standards.

The second thermoplastic resin may, provided that the $T_g$ limitation for the resin is satisfied, optionally include structural units derived from one or more other copolymerizable monoethylenically unsaturated monomers such as, e.g., monoethylenically unsaturated carboxylic acids such as, e.g., acrylic acid, methacrylic acid, and itaconic acid; hydroxy $C_1$–$C_{12}$ alkyl (meth)acrylate monomers such as, e.g., hydroxyethyl methacrylate; $C_4$–$C_{12}$ cycloalkyl (meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides; maleic anhydride; and vinyl esters such as, e.g., vinyl acetate and vinyl propionate. As used in the present context the term "$C_4$–$C_{12}$ cycloalkyl" means a cyclic alkyl substituent group having from 4 to 12 carbon atoms per group and the term "(meth) acrylamide" refers collectively to acrylamides and methacrylamides.

The amount of second thermoplastic resin present in the compositions of the present invention is in one embodiment in a range of between about 0.05 wt % and about 10 wt %, in another embodiment in a range of between about 0.1 wt % and about 8 wt %, in another embodiment in a range of between about 0.2 wt % and about 6 wt %, and in still another embodiment in a range of between about 0.5 wt % and about 4 wt %, based on the weight of the entire composition.

The flame retardant resinous compositions of the present invention comprise at least one rubber modified graft copolymer comprising a discontinuous rubber phase dispersed in a continuous rigid thermoplastic phase, wherein at least a portion of the rigid thermoplastic phase is chemically grafted to the rubber phase. Hereinafter rubber modified graft copolymer is sometimes referred to as rubber modified thermoplastic resin. In one embodiment rubber modified graft copolymers comprise those made by a bulk or, synonymously, mass, polymerization process. In another embodiment rubber modified graft copolymers comprise those made by emulsion polymerization.

Suitable rubbers for use in making the rubber phase comprise those having a glass transition temperature ($T_g$) of in one embodiment less than or equal to 25° C., in another embodiment less than or equal to 0° C., and in still another embodiment less than or equal to minus 30° C. In one embodiment the rubber comprises a polymer, often a linear polymer, having structural units derived from one or more conjugated diene monomers. Suitable conjugated diene monomers comprise, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2, 4, hexadiene, dichlorobutadiene, bromobutadiene and dibromobutadiene as well as mixtures of conjugated diene monomers. In particular embodiments the conjugated diene monomer is at least one of 1,3-butadiene or isoprene.

The rubber may optionally include structural units derived from one or more copolymerizable monoethylenically unsaturated monomers selected from $C_2$–$C_8$ olefin monomers, vinyl aromatic monomers, monoethylenically unsaturated nitrile monomers, and $C_1$–$C_{12}$ alkyl (meth) acrylate monomers. As used herein, the term "$C_2$–$C_8$ olefin monomers" means a compound having from 2 to 8 carbon atoms per molecule and having a single site of ethylenic unsaturation per molecule. Suitable $C_2$–$C_8$ olefin monomers comprise, e.g., ethylene, propene, 1-butene, 1-pentene, and heptene. Suitable vinyl aromatic monomers, monoethylenically unsaturated nitrile monomers, and $C_1$–$C_{12}$ alkyl (meth) acrylate monomers comprise those set forth above in the description of the second thermoplastic resin.

In a particular embodiment the rubber is a polybutadiene homopolymer. In another embodiment the rubber is a copolymer, for example a block copolymer, comprising structural units derived from one or more conjugated diene monomers and up to 50 percent by weight ("wt %") structural units derived from one or more monomers selected from vinyl aromatic monomers and monoethylenically unsaturated nitrile monomers, such as, for example, a styrene-butadiene copolymer, an acrylonitrile-butadiene copolymer or a styrene-butadiene-acrylonitrile copolymer. In another particular embodiment the rubber is a styrene-butadiene block copolymer that contains from about 50 to about 95 wt % structural units derived from butadiene and from about 5 to about 50 wt % structural units derived from styrene. In another particular embodiment the rubber comprises structural units derived from butyl acrylate. In another particular embodiment the rubber is an ethylene-propylene-diene modified rubber.

The elastomeric rubber phase may be made by aqueous emulsion polymerization in the presence of a free radical initiator, a polyacid surfactant and, optionally, a chain transfer agent, and coagulated to form particles of elastomeric phase material. Suitable initiators comprise conventional free radical initiators such as, e.g., an organic peroxide compound, such as e.g., benzoyl peroxide; a persulfate compound, such as, e.g., potassium persulfate; an azonitrile compound such as, e.g., 2,2'-azobis-2,3,3-trimethylbutyronitrile; or a redox initiator system, such as, e.g., a combination of cumene hydroperoxide, ferrous sulfate, tetrasodium pyrophosphate and a reducing sugar or sodium formaldehyde sulfoxylate. Suitable chain transfer agents comprise, for example, a $C_9$–$C_{13}$ alkyl mercaptan compound such as nonyl mercaptan, or t-dodecyl mercaptan.

The emulsion polymerized particles of elastomeric rubber phase material have a weight average particle size in one embodiment of about 50 to about 1000 nanometers ("nm"), in another embodiment of about 50 to about 800 nm, and in another embodiment of from 100 to 500 nm, as measured by light transmission. The size of emulsion polymerized elastomeric particles may optionally be increased by mechanical, colloidal or chemical agglomeration of the emulsion polymerized particles according to known techniques.

The rigid thermoplastic resin phase comprises one or more thermoplastic polymers and exhibits a $T_g$ in one embodiment of greater than about 25° C., in another embodiment of greater than or equal to about 90° C. and in still another embodiment of greater than or equal to about 100° C. In a particular embodiment the rigid thermoplastic phase comprises one or more polymers each having structural units derived from one or more monomers selected from the group consisting of $C_1$–$C_{12}$ alkyl (meth)acrylate monomers, vinyl aromatic monomers and monoethylenically unsaturated nitrile monomers. Suitable vinyl aromatic monomers and monoethylenically unsaturated nitrile monomers and of $C_1$–$C_{12}$ alkyl (meth)acrylate monomers comprise those set forth above in the description of the rubber phase.

In a particular embodiment the rigid thermoplastic resin phase comprises a vinyl aromatic polymer having first structural units derived from one or more vinyl aromatic monomers, for example styrene, and having second structural units derived from one or more monoethylenically unsaturated nitrile monomers, for example acrylonitrile. The rigid phase comprises in some embodiments from about 55 to about 99 wt %, and in other embodiments from about 60 to about 90 wt %, structural units derived from styrene and in some embodiments from about 1 to about 45 wt %, and in other embodiments from about 10 to about 40 wt %, structural units derived from acrylonitrile.

The relative amount of rubber phase in the rubber modified graft copolymer is in one embodiment in a range between about 2 wt % and about 70 wt %, in another embodiment in a range between about 6 wt % and about 65 wt %, in another embodiment in a range between about 8 wt % and about 50 wt %, in another embodiment in a range between about 10 wt % and about 40 wt %, and in still another embodiment in a range between about 12 wt % and about 24 wt %, based on the weight of the rubber modified graft copolymer. The amount of grafting that takes place between the rigid thermoplastic phase and the rubber phase varies with the relative amount and composition of the rubber phase. In one embodiment from about 10 to about 90 wt % of the rigid thermoplastic phase is chemically grafted to the rubber phase and from about 10 to about 90 wt % of the rigid thermoplastic phase remains "free", i.e., non-grafted. In another embodiment from about 40 to about 75 wt % of the rigid thermoplastic phase is chemically grafted to the rubber phase and from about 25 to about 60 wt % of the rigid thermoplastic phase remains free.

In various embodiments the rigid thermoplastic phase of the rubber modified thermoplastic resin may be formed: (i) solely by polymerization carried out in the presence of the rubber phase or (ii) by addition of one or more separately polymerized rigid thermoplastic polymers to a rigid thermoplastic polymer that has been polymerized in the presence of the rubber phase. In a particular embodiment one or more separately polymerized rigid thermoplastic polymers is combined with a rigid thermoplastic polymer that has been polymerized in the presence of the rubber phase in order to aid in adjusting the viscosity of the composition of the present invention into some desired range. In a particular embodiment the weight average molecular weight of the one or more separately polymerized rigid thermoplastic polymers is from about 50,000 to about 100,000 g/mol. relative to polystyrene standards.

In another particular embodiment the rubber modified thermoplastic resin comprises a rubber phase comprising a polymer having structural units derived from one or more conjugated diene monomers, and, optionally, further comprising structural units derived from one or more monomers selected from vinyl aromatic monomers and monoethylenically unsaturated nitrile monomers; and the rigid thermoplastic phase comprises a polymer having structural units derived from one or more monomers selected from vinyl aromatic monomers and monoethylenically unsaturated nitrile monomers. In still another particular embodiment the rubber phase of the rubber modified thermoplastic resin comprises a polybutadiene or poly(styrene-butadiene) rubber and the rigid phase comprises a styrene-acrylonitrile copolymer.

Each of the polymers of the rubber phase and of the rigid thermoplastic resin phase of the rubber modified thermoplastic resin may, provided that the $T_g$ limitation for the respective phase is satisfied, optionally include structural units derived from one or more other copolymerizable monoethylenically unsaturated monomers such as, e.g., monoethylenically unsaturated carboxylic acids such as, e.g., acrylic acid, methacrylic acid, and itaconic acid; hydroxy $C_1$–$C_{12}$ alkyl (meth)acrylate monomers such as, e.g., hydroxyethyl methacrylate; $C_4$–$C_{12}$ cycloalkyl (meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides; maleic anhydride; and vinyl esters such as, e.g., vinyl acetate and vinyl propionate. As used in the present context the term "$C_4$–$C_{12}$ cycloalkyl" means a cyclic alkyl substituent group having from 4 to 12 carbon atoms per group and the term "(meth) acrylamide" refers collectively to acrylamides and methacrylamides. The rubber phase of rubber modified thermoplastic resin has a particle size in one embodiment of from about 0.1 to about 10 micrometers ("$\mu$m"), in another embodiment of from about 0.1 to about 3.0 micrometers, and in another embodiment from about 0.2 to about 2.0 $\mu$m. In some embodiments compositions of the present invention may comprise at least one aromatic polycarbonate resin in combination with a mixture of at least one rubber modified graft copolymer and at least one of a second thermoplastic resin which is not a polycarbonate resin, wherein the second thermoplastic resin comprises a majority of monomer structural units which are the same as those of the rigid thermoplastic phase of the rubber modified graft copolymer.

The amount of rubber modified graft copolymer present in the compositions of the present invention is in one embodiment in a range of between about 0.05 wt % and about 10 wt %, in another embodiment in a range of between about 0.1 wt % and about 8 wt %, in another embodiment in a range of between about 0.2 wt % and about 6 wt %, and in still another embodiment in a range of between about 0.5 wt % and about 4.5 wt %, based on the weight of the entire composition.

The flame retardant resinous compositions of the present invention comprise at least one polymeric or non-polymeric organic phosphorus species selected from the group consisting of phosphate esters, thiophosphate esters, phosphonate esters, thiophosphonate esters, phosphinate esters, thiophosphinate esters, phosphines, including triphenylphosphine, phosphine oxides, including triphenylphosphine oxide and tris(2-cyanoethyl)phosphine oxide, thiophosphine oxides, and phosphonium salts. In some embodiments organic phosphorus species are non-polymeric phosphate esters including, for example, alkyl phosphate esters, aryl phosphate esters, resorcinol-based phosphate esters, and bisphenol-based phosphate esters. In other embodiments organic phosphorus species are aromatic phosphates. Illustrative, non-limiting examples of such phosphorus species include triphenylphosphate, tricresylphosphate, resorcinol bis(diphenylphosphate), bisphenol A bis(diphenylphosphate), and other aromatic phosphate esters known in the art.

The organic phosphorus species is present in the compositions of the invention in an amount in one embodiment in a range of between about 0.5 wt % and about 15 wt %, in another embodiment in a range of between about 1 wt % and about 8 wt %, and in still another embodiment in a range of between about 2 wt % and about 6 wt %, based on the weight of the entire composition.

In various embodiments the flame retardant resinous compositions of the present invention comprise a fluoropolymer in an amount that is effective to provide anti-drip properties to the resin composition. The amount of fluoropolymer present in the compositions is in one embodiment in a range of between about 0.01 wt % and about 2 wt %, and in another embodiment in a range of between about 0.1 wt % and about 1 wt %, based on the weight of the entire composition. Suitable fluoropolymers and methods for making such fluoropolymers are known, see, e.g., U.S. Pat. Nos. 3,671,487 and 3,723,373. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Suitable fluorinated alpha-olefin monomers include, e.g., fluoroethylenes such as, e.g., $CF_2$=$CF_2$, $CHF$=$CF_2$, $CH_2$=$CF_2$, $CH_2$=$CHF$, $CClF$=$CF_2$, $CCl_2$=$CF_2$, $CClF$=$CClF$, $CHF$=$CCl_2$, $CH_2$=$CClF$, and $CCl_2$=$CClF$ and fluoropropylenes such as, e.g., $CF_3CF$=$CF_2$, $CF_3CH$=$CHF$, $CF_3CH$=$CF_2$, $CF_3CH$=$CH_2$, $CF_3CF$=$CHF$, $CHF_2CH$=$CHF$ and $CF_3CF$=$CH_2$. In a particular embodiment the fluorinated alpha-olefin monomer is one or more of tetrafluoroethylene ($CF_2$=$CF_2$), chlorotrifluoroethylene ($CClF$=$CF_2$), vinylidene fluoride ($CH_2$=$CF_2$) and hexafluoropropylene ($CF_2$=$CFCF_3$). In various embodiments suitable fluorinated alpha-olefin homopolymers include e.g., poly(tetrafluoroethylene) and poly(hexafluoroethylene).

In other embodiments suitable fluorinated alpha-olefin copolymers include copolymers comprising structural units derived from two or more fluorinated alpha-olefin copolymers such as, e.g., poly(tetrafluoroethylene-hexafluoroethylene), and copolymers comprising structural units derived from one or more fluorinated monomers and one or more non-fluorinated monoethylenically unsaturated monomers that are copolymerizable with the fluorinated monomers such as, e.g., poly(tetrafluoroethylene-ethylene-propylene) copolymers. Suitable non-fluorinated monoethylenically unsaturated monomers include e.g., alpha-olefin monomers such as, e.g., ethylene, propylene, butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, vinyl versatate. In a particular embodiment the fluoropolymer particles range in size from about 50 nm to about 500 nm as measured by electron microscopy. In a particular embodiment the fluoropolymer is a poly (tetrafluoroethylene) homopolymer ("PTFE").

Since direct incorporation of a fluoropolymer into a thermoplastic resin composition tends to be difficult, the fluoropolymer may in one embodiment be preblended in some manner with a second polymer to form a concentrate. In one embodiment the second polymer is at least one other resinous component of the composition. In a particular embodiment the second polymer is a thermoplastic resin, such as for example an aromatic polycarbonate resin or a styrene-acrylonitrile resin. For example, an aqueous dispersion of fluoropolymer and a polycarbonate resin may be steam precipitated to form a fluoropolymer concentrate for use as a drip inhibitor additive in thermoplastic resin compositions, as disclosed in, for example, U.S. Pat. No. 5,521,230, or, alternatively, an aqueous styrene-acrylonitrile resin emulsion, or an aqueous acrylonitrile-butadiene-styrene resin emulsion may be used, wherein following precipitation a co-coagulated fluoropolymer-thermoplastic resin composition is dried to provide a PTFE-thermoplastic resin powder as disclosed in, for example, U.S. Pat. No. 4,579,906.

The fluoropolymer additive in the form of fluoropolymer-thermoplastic resin powder comprises in one embodiment from about 10 to about 90 wt %, in another embodiment from about 30 to about 70 wt %, and in still another embodiment from about 40 to about 60 wt % fluoropolymer, and in one embodiment from about 30 to about 70 wt %, and in another embodiment from about 40 to about 60 wt % of the second polymer.

In another embodiment a fluoropolymer additive may be made by emulsion polymerization of one or more monoethylenically unsaturated monomers in the presence of aqueous fluoropolymer dispersion to form a second polymer in the presence of the fluoropolymer. Suitable monoethylenically unsaturated monomers are disclosed above. The emulsion is then precipitated, e.g., by addition of sulfuric acid. The precipitate is dewatered, e.g., by centrifugation, and then dried to form a fluoropolymer additive that comprises fluoropolymer and an associated second polymer. The dry emulsion polymerized fluoropolymer additive is in the form of a free-flowing powder. In another embodiment the monoethylenically unsaturated monomers that are emulsion polymerized to form the second polymer comprise one or more monomers selected from vinyl aromatic monomers, monoethylenically unsaturated nitrile monomers and $C_1$–$C_{12}$ alkyl (meth)acrylate monomers. Suitable vinyl aromatic monomers, monoethylenically unsaturated nitrile monomers and $C_1$–$C_{12}$ alkyl (meth)acrylate monomers are disclosed above. In a particular embodiment the second polymer comprises structural units derived from styrene and acrylonitrile. In another particular embodiment the second polymer comprises from about 60 to about 90 wt % structural units derived from styrene and from about 10 to about 40 wt % structural units derived from acrylonitrile. The emulsion polymerization reaction mixture may optionally include emulsified or dispersed particles of a third polymer, such as, e.g., an emulsified butadiene rubber latex. The emulsion polymerization reaction may be initiated using a conventional free radical initiator, as disclosed above with respect to the rubber modified graft copolymer. A chain transfer agent such as, e.g., a $C_9$–$C_{13}$ alkyl mercaptan compound such as nonyl mercaptan, t-dodecyl mercaptan, may, optionally, be added to the reaction vessel during the polymerization reaction to reduce the molecular weight of the second polymer. In a particular embodiment, no chain transfer agent is used. In another embodiment, the stabilized fluoropolymer dispersion is charged to a reaction vessel and heated with stirring. The initiator system and the one or more monoethylenically unsaturated monomers are then charged to the reaction vessel and heated to polymerize the monomers in the presence of the fluoropolymer particles of the dispersion to thereby form the second polymer. Suitable fluoropolymer additives and emulsion polymerization methods are disclosed, for example, in U.S. Pat. No. 5,804,654. In a particular embodiment, the second polymer exhibits a weight average molecular weight of from about 10,000 to about 200,000 g/mol. relative to polystyrene standards.

The flame retardant resinous compositions of the present invention comprise at least one polymeric or non-polymeric perfluoroalkanesulfonate salt. In various embodiments perfluoroalkanesulfonate salts comprise those derived from at least one of perfluoromethylbutanesulfonic acid, perfluoromethanesulfonic acid, perfluoroethanesulfonic acid, perfluoropropanesulfonic acid, perfluorobutanesulfonic acid (also known as nonafluorobutanesulfonic acid), perfluoropentanesulfonic acid, perfluorohexanesulfonic acid, perfluoroheptanesulfonic acid, perfluorooctanesulfonic acid, and other perfluoroalkanesulfonic acids. In various embodiments perfluoroalkanesulfonate salts comprise alkali metal or ammonium salts, such as, but not limited to, sodium, potassium, tetraalkylammonium, tetraethylammonium, tetrabutylammonium, and methyltributylammonium. In particular embodiments perfluoroalkanesulfonate salts comprise potassium perfluorobutanesulfonate, potassium perfluorooctanesulfonate, tetraethylammonium perfluorobutanesulfonate, and tetraethylammonium perfluoromethylbutanesulfonate.

The perfluoroalkanesulfonate salt is present in the compositions of the invention in an amount in one embodiment in a range of between about 0.01 wt % and about 0.25 wt %, in another embodiment in a range of between about 0.03 wt % and about 0.2 wt %, in another embodiment in a range of between about 0.05 wt % and about 0.15 wt %, and in still another embodiment in a range of between about 0.07 wt % and about 0.13 wt %, based on the weight of the entire composition.

The flame retardant resinous compositions of the present invention may optionally comprise at least one impact modifier which is different from any rubber modified graft copolymer and any rubber in the rubber modified graft copolymer, as described above. In various embodiments suitable impact modifiers comprise those which are core-shell type impact modifiers comprising a poly(alkyl acrylate) or poly(alkyl methacrylate) shell. In other embodiments suitable impact modifiers comprise those which are core-shell type impact modifiers comprising a poly (methylmethacrylate) shell. In other embodiments suitable impact modifiers comprise those which are core-shell type impact modifiers including a shell comprising poly (methylmethacrylate) and a core comprising a polybutadiene rubber. In still other embodiments suitable impact modifiers comprise those which are core-shell type impact modifiers including a shell comprising poly (methylmethacrylate) and a core comprising a silicone rubber. Illustrative silicone rubbers may comprise poly (diorganosiloxanes) such as poly(dimethylsiloxane). In other embodiments suitable impact modifiers comprise those which are core-shell type impact modifiers including a shell comprising poly(methylmethacrylate) and a core comprising a silicone rubber and at least one other polymer with a glass transition temperature higher than that of the silicone rubber. In still other embodiments suitable impact modifiers comprise those which are core-shell type impact modifiers including a shell comprising poly (methylmethacrylate) and a core comprising a silicone rubber and at least one poly(alkylacrylate) with a glass transition temperature higher than that of the silicone rubber. In a particular embodiment a suitable impact modifier is core-shell type impact modifiers including a shell comprising poly(methylmethacrylate) and a core comprising a silicone rubber and poly(butylacrylate). One type of suitable core-shell impact modifier can be prepared in accordance with the method of Sasaki et al. as taught in U.S. Pat. No. 5,132,359. In some embodiments suitable impact modifiers include those sold under the tradename METABLEN by Mitsubishi Rayon Co., Ltd.

When present, the impact modifier is present in the compositions of the invention in an amount in one embodiment in a range of between about 0.01 wt % and about 4 wt %, in another embodiment in a range of between about 0.02 wt % and about 2 wt %, in another embodiment in a range of between about 0.05 wt % and about 1 wt %, in another embodiment in a range of between about 0.1 wt % and about 1 wt %, and in still another embodiment in a range of between about 0.2 wt % and about 1 wt %, based on the weight of the entire composition.

The term "alkyl" as used in the various embodiments of the present invention is intended to designate both normal alkyl, branched alkyl, aralkyl, and cycloalkyl radicals. In various embodiments normal and branched alkyl radicals are those containing from 1 to about 12 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments cycloalkyl radicals represented are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those containing from 6 to 12 ring carbon atoms. Some illustrative non-limiting examples of these aryl radicals include phenyl, biphenyl, and naphthyl. Halogen radicals used in some embodiments of the present invention are chlorine and bromine.

The flame retardant resinous compositions of the invention may also contain other conventional additives including antistatic agents, stabilizers such as heat stabilizers and light stabilizers, pigments, dyes, UV screeners, inhibitors, plasticizers, flow promoters, auxiliary flame retardants, mold release agents, auxiliary impact modifiers, ester interchange inhibitors, other anti-drip agents, and fillers. In some embodiments compositions of the invention comprise either at least one extending filler, or at least one reinforcing filler, or both of at least one extending filler and at least one reinforcing filler. Representative examples of extending fillers comprise carbon black, silica, alumina, magnesia, talc, mica, glass beads, hollow glass beads, and the like. Representative examples of reinforcing fillers comprise carbon fibers, glass fibers, quartz, and the like. Representative examples of mold release agents include pentaerythritol tetrastearate, octyl behenate, and polyethylene.

Although the invention is not dependent upon any theory of operation, it is possible that under certain processing conditions additives or polymeric resins or both may at least partially react through processes well known in the art, for example transesterification. The various embodiments of the invention are inclusive of compositions in which one or more of components has undergone chemical reaction, either by itself or in combination with at least one other blend component. That is, the invention includes both compositions comprising said components as initially present and compositions comprising any reaction products thereof. When proportions are specified in the compositions, they apply to the originally incorporated materials rather than those remaining after any such reaction.

In another embodiment the present invention comprises methods for making the compositions disclosed herein. The flame retardant resinous compositions of the present invention may be made by combining and mixing the components of the composition under conditions suitable for the formation of a blend of the components, such as for example, by melt mixing using, for example, a two-roll mill, a Banbury mixer or a single screw or twin-screw extruder, and, optionally, then reducing the composition so formed to particulate form, e.g., by pelletizing or grinding the composition. In some embodiments one or more components can be added to the composition as an aqueous mixture or solution followed by devolatilization in appropriate processing equipment such as in an extruder. The thermoplastic resin compositions of the present invention can be molded into useful shaped articles by a variety of means such as injection molding, extrusion, rotational molding, blow molding and thermoforming to form articles such as, for example, computer and business machine housings, home appliances.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES 1–3 AND COMPARATIVE
EXAMPLES 1–6

In the following examples the components were bisphenol A polycarbonate with a weight average molecular weight (relative to polystyrene standards) in a range of between about 40,000 and about 50,000; ABS comprising about a 75:25 weight ratio of styrene to acrylonitrile and about 8–25% grafted polybutadiene with overall weight average molecular weight of the styrene/acrylonitrile portion in a range of between about 50,000 and about 100,000 relative to polystyrene standards; SAN comprising about a 75:25 weight ratio of styrene to acrylonitrile with overall weight average molecular weight in a range of between about 50,000 and about 100,000 relative to polystyrene standards; and polytetrafluoroethylene added as a 50 wt % concentrate in SAN to provide 0.5 wt % polytetrafluoroethylene based on the total weight of the composition. Unless noted, all of the compositions in the examples also contained 0.52 wt % of mold release agents and thermal stabilizers which are not believed to affect the flame resistance properties. Potassium perfluorobutanesulfonate (abbreviated "Salt" in the Table) was added to compositions as noted. At least one organic phosphate was added to compositions as noted. The abbreviation "RDP" means resorcinol bis(diphenylphosphate); the abbreviation "BPADP" means bisphenol A bis (diphenylphosphate). In some examples an impact modifier ("IM") was added to compositions as noted. The impact modifier was a core-shell type material with a core comprising a silicone rubber and a shell comprising poly(methylmethacrylate), and sold under the name METABLEN S-2001 by Mitsubishi Rayon Co., Ltd.

Compositions in the examples were prepared by dry blending in a Henschel mixer following by extrusion and molding using typical processing equipment at around 250–280° C. "As molded average FOT" refers to the sum in seconds of the average of the first and second flame-out times for 10 one-sixteenth inch thick test bars tested as per the UL94 protocol shortly after molding. "Conditioned average FOT" refers to the sum in seconds of the average of the first and second flame-out times for 10 one-sixteenth inch thick test bars tested as per the UL94 protocol after conditioning for at least 48 hours at 23° C. and 50% relative humidity. The results for flame resistance tests are shown in Table 1 compared to control compositions without both phosphate and perfluoroalkanesulfonate salt. The abbreviation "CEx." means comparative example.

TABLE 1

| Ex. # | PC % | SAN %* | ABS % | IM % | Phosphate (%) | Salt % | As molded avg. FOT (sec.) | Conditioned avg. FOT (sec.) |
|---|---|---|---|---|---|---|---|---|
| CEx. 1 | 94.48 | 0.5 | 4 | 0 | — | — | 2.9 | 12.4 |
| CEx. 2 | 94.38 | 0.5 | 4 | 0 | — | 0.1 | 3.77 | 14.1 |
| CEx. 3 | 92.48 | 0.5 | 4 | 0 | RDP (2) | — | 3.1 | 14.5 |
| 1 | 92.38 | 0.5 | 4 | 0 | RDP (2) | 0.1 | 2.7 | 5.1 |
| 2 | 92.38 | 0.5 | 2 | 0 | RDP (4) | 0.1 | 2.1 | 8.1 |
| CEx. 4 | 92.18 | 0.5 | 2 | 0 | RDP (4) | 0.3 | 2.4 | 29.8 |
| CEx. 5 | 94.28 | 4 | 0.5 | 0.2 | — | — | — | 29 |
| CEx. 6 | 94.2 | 4 | 0.5 | 0.2 | — | 0.08 | — | 11.5 |
| 3 | 92.2 | 4 | 0.5 | 0.2 | BPADP (2) | 0.08 | — | 7.2 |

*includes 0.5 wt % SAN derived from polytetrafluoroethylene concentrate

The data show that a control composition (CEx. 1) without perfluoroalkanesulfonate salt or phosphate has unacceptable FOT after conditioning. Similarly, compositions comprising either perfluoroalkanesulfonate salt without phosphate or phosphate without perfluoroalkanesulfonate salt have unacceptable FOT after conditioning (CEx. 2 and CEx. 3). In contrast compositions comprising both phosphate and perfluoroalkanesulfonate salt, the latter in an amount between about 0.01 wt % and about 0.25 wt % based on the weight of the entire composition, have improved FOT after conditioning (Examples 1 and 2). A control composition (CEx. 4) comprising phosphate and 0.3 wt % perfluoroalkanesulfonate salt has unacceptable FOT after conditioning. Similar results are obtained in compositions comprising an impact modifier. These results show that compositions of the invention provide good flame resistance in molded parts after exposure to conditions of humidity similar to those which may be experienced by commercial articles made from said compositions. Therefore, in another of its embodiments the present invention comprises a method for obtaining UL94 V-0 flame resistance rating in molded parts following exposure to an atmosphere of at least 50% relative humidity for at least 48 hours at room temperature. In some particular embodiments compositions of the invention comprise between about 0.07 wt % and about 0.13 wt % perfluoroalkanesulfonate salt, between about 3 wt % and about 5 wt % organic phosphorus species, and between about 3 wt % and about 5 wt % ABS, wherein all amounts are based on the weight of the entire composition.

In other particular embodiments compositions of the invention comprise between about 0.07 wt % and about 0.13 wt % perfluoroalkanesulfonate salt, between about 1 wt % and about 2.5 wt % organic phosphorus species, and between about 1 wt % and about 2.5 wt % ABS, wherein all amounts are based on the weight of the entire composition.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents cited herein are incorporated herein by reference.

What is claimed is:

1. A flame retardant resinous composition comprising
   (i) at least one aromatic polycarbonate present in an amount in a range of between about 88 wt % and about 98 wt %, based on the weight of the entire composition;
   (ii) at least one of a second polymer having structural units derived from one or more monomers selected from the group consisting of vinyl aromatic monomers, monoethylenically unsaturated nitrile monomers, and $C_1$–$C_{12}$ alkyl (meth)acrylate monomers;
   (iii) at least one rubber modified graft copolymer;
   (iv) at least one polymeric or non-polymeric organic phosphorus species;
   (v) at least one antidrip agent; and
   (vi) at least one perfluoroalkanesulfonate salt present in an amount in a range between about 0.01 wt % and about 0.25 wt %, based on the weight of the entire composition.

2. The composition of claim 1 wherein the aromatic polycarbonate comprises structural units derived from at least one dihydric phenol selected from the group consisting of 6-hydroxy-1-(4'-hydroxyphenyl)-1,3,3-trimethylindane; 4,4'-(3,3,5-trimethylcyclohexylidene)diphenol; 1,1-bis(4-hydroxy-3-methylphenyl)cyclohexane; 2,2-bis(4-hydroxyphenyl)propane; 4,4-bis(4-hydroxyphenyl)heptane; 2,2-bis(4-hydroxy-3,5-dimethylphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4- hydroxyphenyl)cyclohexylmethane; 2,2-bis(4-hydroxyphenyl)-1-phenylpropane; 3,5,3',5'-tetrachloro-4,4'-dihydroxyphenyl)propane; 2,4'-dihydroxyphenyl sulfone; 2,6-dihydroxy naphthalene; 6,6'-dihydroxy-3,3,3',3'-tetramethyl-1,1'-spirobiindane; hydroquinone, resorcinol; $C_{1-3}$ alkyl-substituted resorcinols; 3-(4-hydroxyphenyl)-1,1,3-trimethylindan-5-ol, and 1-(4-hydroxyphenyl)-1,3,3-trimethylindan-5-ol.

3. The composition of claim 2 wherein the dihydric phenol comprises bisphenol A.

4. The composition of claim 1 wherein the second polymer comprises first structural units derived from one or more vinyl aromatic monomers, and second structural units derived from one or more monoethylenically unsaturated nitrile monomers.

5. The composition of claim 4 wherein the second polymer comprises structural units derived from styrene and acrylonitrile.

6. The composition of claim 4 wherein the second polymer is present in an amount in a range of between about 0.05 wt % and about 10 wt %, based on the weight of the entire composition.

7. The composition of claim 1 wherein the rubber modified graft copolymer comprises a discontinuous rubber phase dispersed in a continuous rigid thermoplastic phase, wherein at least a portion of the rigid thermoplastic phase is chemically grafted to the rubber phase.

8. The composition of claim 7 wherein the rubber phase has a glass transition temperature of less than or equal to 25° C.

9. The composition of claim 8 wherein the rubber comprises structural units derived from at least one of 1,3-butadiene, isoprene, or butyl acrylate.

10. The composition of claim 7 wherein the rigid thermoplastic resin has a glass transition temperature of greater than about 25° C., and from about 10 to about 90 wt % of the rigid thermoplastic phase is chemically grafted to the rubber phase.

11. The composition of claim 7 wherein the rubber phase comprises a polybutadiene rubber, poly(styrene-butadiene) rubber, poly(butyl acrylate) rubber, or ethylene-propylene-diene modified rubber; and the rigid thermoplastic phase comprises a styrene-acrylonitrile copolymer.

12. The composition of claim 7 wherein the rubber modified graft copolymer is present in an amount in a range of between about 0.05 wt % and about 10 wt %, based on the weight of the entire composition.

13. The composition of claim 1 wherein the organic phosphorus species is selected from the group consisting of phosphate esters, thiophosphate esters, phosphonate esters, thiophosphonate esters, phosphinate esters, thiophosphinate esters, phosphines, triphenylphosphine, phosphine oxides, triphenylphosphine oxide, tris(2-cyanoethyl)phosphine oxide, thiophosphine oxides, and phosphonium salts.

14. The composition of claim 13 wherein the organic phosphorus species is an aromatic phosphate.

15. The composition of claim 14 wherein the aromatic phosphate is selected from the group consisting of triphenylphosphate, tricresylphosphate, resorcinol bis (diphenylphosphate), and bisphenol A bis (diphenylphosphate).

16. The composition of claim 13 wherein the organic phosphorus species is present in an amount in a range of between about 0.5 wt % and about 15 wt %, based on the weight of the entire composition.

17. The composition of claim 1 wherein the antidrip agent comprises at least one fluoropolymer.

18. The composition of claim 17 wherein the fluoropolymer is present in an amount in a range of between about 0.01 wt % and about 2 wt %, based on the weight of the entire composition.

19. The composition of claim 17 wherein the fluoropolymer comprises polytetrafluoroethylene.

20. The composition of claim 17 wherein the fluoropolymer is added to the composition in the form of a concentrate in at least one other resinous component of the composition.

21. The composition of claim 20 wherein the fluoropolymer is added to the composition in the form of a concentrate in styrene-acrylonitrile copolymer.

22. The composition of claim 1 wherein the perfluoroalkanesulfonate salt comprises a sodium, potassium, or tetraalkylammonium salt of a perfluoroalkanesulfonic acid selected from the group consisting of perfluoromethylbutanesulfonic acid, perfluoromethanesulfonic acid, perfluoroethanesulfonic acid, perfluoropropanesulfonic acid, perfluorobutanesulfonic acid, perfluoropentanesulfonic acid, perfluorohexanesulfonic acid, perfluorohepanesulfonic acid, perfluorooctanesulfonic acid, and mixtures thereof.

23. The composition of claim 22 wherein the perfluoroalkanesulfonate salt comprises potassium perfluorobutanesulfonate.

24. The composition of claim 1 further comprising at least one core-shell impact modifier comprising a poly(alkyl acrylate) or poly(alkyl methacrylate) shell.

25. The composition of claim 24 wherein the core-shell impact modifier comprises a poly(methylmethacrylate) shell.

26. The composition of claim 24 wherein the impact modifier is present in an amount in a range of between about 0.01 wt % and about 4 wt %, based on the weight of the entire composition.

27. A flame retardant resinous composition comprising:
(vii) a bisphenol A polycarbonate present in an amount in a range of between about 88 wt % and about 98 wt %;
(viii) a styrene-acrylonitrile copolymer present in an amount in a range of between about 0.2 wt % and about 6 wt %;
(ix) a rubber modified graft copolymer present in an amount in a range of between about 0.2 wt % and about 6 wt %, and comprising a polybutadiene or poly (styrene-butadiene) rubber, and a styrene-acrylonitrile copolymer;
(x) an aromatic phosphate present in an amount in a range of between about 2 wt % and about 6 wt %, and selected from the group consisting of triphenylphosphate, tricresylphosphate, resorcinol bis (diphenylphosphate), and bisphenol A bis (diphenylphosphate);
(xi) polytetrafluoroethylene present in an amount in a range of between about 0.1 wt % and about 1 wt %; and
(xii) potassium perfluorobutanesulfonate present in an amount in a range of between about 0.05 wt % and about 0.2 wt %;
wherein all amounts are based on the weight of the entire composition.

28. The composition of claim 27 further comprising at least one core-shell impact modifier present in an amount in a range of between about 0.1 wt % and about 1 wt %, based on the weight of the entire composition, and comprising a poly(methylmethacrylate) shell.

29. A method for making a flame retardant resinous composition comprising:
(i) at least one aromatic polycarbonate present in an amount in a range of between about 88 wt % and about 98 wt %, based on the weight of the entire composition;

(ii) at least one of a second polymer having structural units derived from one or more monomers selected from the group consisting of vinyl aromatic monomers, monoethylenically unsaturated nitrile monomers, and $C_1$–$C_{12}$ alkyl (meth)acrylate monomers;

(iii) at least one rubber modified graft copolymer;

(iv) at least one polymeric or non-polymeric organic phosphorus species;

(v) at least one antidrip agent; and (vi) at least one perfluoroalkanesulfonate salt present in an amount in a range between about 0.01 wt % and about 0.25 wt %, based on the weight of the entire composition, which comprises combining and mixing the components of the composition under conditions suitable for the formation of a blend of the components, and, optionally, then reducing the composition so formed to particulate form.

30. The method of claim 29 wherein the aromatic polycarbonate comprises structural units derived from at least one dihydric phenol selected from the group consisting of 6-hydroxy-1-(4'-hydroxyphenyl)-1,3,3-trimethylindane, 4,4'-(3,3,5-trimethylcyclohexylidene)diphenol; 1,1-bis(4-hydroxy-3-methylphenyl)cyclohexane; 2,2-bis(4-hydroxyphenyl)propane; 4,4-bis(4-hydroxyphenyl)heptane; 2,2-bis(4-hydroxy-3,5-dimethylphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl) propane; 2,4'-dihydroxydiphenylmethane; bis(2-hydroxyphenyl)methane; bis(4-hydroxy-phenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl) ethane; 2,2-bis(3-phenyl-4-hydroxyphenyl)-propane; bis(4-hydroxyphenyl)cyclohexylmethane; 2,2-bis(4-hydroxyphenyl)-1-phenylpropane; 3,5,3',5'-tetrachloro-4,4'-dihydroxyphenyl)propane; 2,4'-dihydroxyphenyl sulfone; 2,6-dihydroxy naphthalene; 6,6'-dihydroxy-3,3,3',3'-tetramethyl-1,1'-spirobiindane; hydroquinone, resorcinol; $C_{1-3}$ alkyl-substituted resorcinols; 3-(4-hydroxyphenyl)-1,1, 3-trimethylindan-5-ol, and 1-(4-hydroxyphenyl)-1,3,3-trimethylindan-5-ol.

31. The method of claim 30 wherein the dihydric phenol comprises bisphenol A.

32. The method of claim 29 wherein the second polymer comprises first structural units derived from one or more vinyl aromatic monomers, and second structural units derived from one or more monoethylenically unsaturated nitrile monomers.

33. The method of claim 32 wherein the second polymer comprises structural units derived from styrene and acrylonitrile.

34. The method of claim 32 wherein the second polymer is present in an amount in a range of between about 0.05 wt % and about 10 wt %, based on the weight of the entire composition.

35. The method of claim 29 wherein the rubber modified graft copolymer comprises a discontinuous rubber phase dispersed in a continuous rigid thermoplastic phase, wherein at least a portion of the rigid thermoplastic phase is chemically grafted to the rubber phase.

36. The method of claim 35 wherein the rubber phase has a glass transition temperature of less than or equal to 25° C.

37. The method of claim 36 wherein the rubber comprises structural units derived from at least one of 1,3-butadiene, isoprene, or butyl acrylate.

38. The method of claim 35 wherein the rigid thermoplastic resin has a glass transition temperature of greater than about 25° C., and from about 10 to about 90 wt % of the rigid thermoplastic phase is chemically grafted to the rubber phase.

39. The method of claim 35 wherein the rubber phase comprises a polybutadiene rubber, poly(styrene-butadiene) rubber, poly(butyl acrylate) rubber, or ethylene-propylene-diene modified rubber; and the rigid thermoplastic phase comprises a styrene-acrylonitrile copolymer.

40. The method of claim 35 wherein the rubber modified graft copolymer is present in an amount in a range of between about 0.05 wt % and about 10 wt %, based on the weight of the entire composition.

41. The method of claim 29 wherein the organic phosphorus species is selected from the group consisting of phosphate esters, thiophosphate esters, phosphonate esters, thiophosphonate esters, phosphinate esters, thiophosphinate esters, phosphines, triphenylphosphine, phosphine oxides, triphenylphosphine oxide, tris(2-cyanoethyl)phosphine oxide, thiophosphine oxides, and phosphonium salts.

42. The method of claim 41 wherein the organic phosphorus species is an aromatic phosphate.

43. The method of claim 42 wherein the aromatic phosphate is selected from the group consisting of triphenylphosphate, tricresylphosphate, resorcinol bis (diphenylphosphate), and bisphenol A bis (diphenylphosphate).

44. The method of claim 41 wherein the organic phosphorus species is present in an amount in a range of between about 0.5 wt % and about 15 wt %, based on the weight of the entire composition.

45. The method of claim 29 wherein the antidrip agent comprises at least one fluoropolymer.

46. The method of claim 45 wherein the fluoropolymer is present in an amount in a range of between about 0.01 wt % and about 2 wt %, based on the weight of the entire composition.

47. The method of claim 45 wherein the fluoropolymer comprises polytetrafluoroethylene.

48. The method of claim 45 wherein the fluoropolymer is added to the composition in the form of a concentrate in at least one other resinous component of the composition.

49. The method of claim 48 wherein the fluoropolymer is added to the composition in the form of a concentrate in styrene-acrylonitrile copolymer.

50. The method of claim 29 wherein the perfluoroalkanesulfonate salt comprises a sodium, potassium, or tetraalkylammonium salt of a perfluoroalkanesulfonic acid selected from the group consisting of perfluoromethylbutanesulfonic acid, perfluoromethanesulfonic acid, perfluoroethanesulfonic acid, perfluoropropanesulfonic acid, perfluorobutanesulfonic acid, perfluoropentanesulfonic acid, perfluorohexanesulfonic acid, perfluorohepanesulfonic acid, perfluorooctanesulfonic acid, and mixtures thereof.

51. The method of claim 50 wherein the perfluoroalkanesulfonate salt comprises potassium perfluorobutanesulfonate.

52. The method of claim 29 wherein the composition further comprises at least one core-shell impact modifier comprising a poly(alkyl acrylate) or poly(alkyl methacrylate) shell.

53. The method of claim 52 wherein the core-shell impact modifier comprises a poly(methylmethacrylate) shell.

54. The method of claim 52 wherein the impact modifier is present in an amount in a range of between about 0.01 wt % and about 4 wt %, based on the weight of the entire composition.

55. A method for making a flame retardant resinous composition comprising:
- (vii) a bisphenol A polycarbonate present in an amount in a range of between about 88 wt % and about 98 wt %;
- (viii) a styrene-acrylonitrile copolymer present in an amount in a range of between about 0.2 wt % and about 6 wt %;
- (ix) a rubber modified graft copolymer present in an amount in a range of between about 0.2 wt % and about 6 wt %, and comprising a polybutadiene or poly(styrene-butadiene) rubber, and a styrene-acrylonitrile copolymer;
- (x) an aromatic phosphate present in an amount in a range of between about 2 wt % and about 6 wt %, and selected from the group consisting of triphenylphosphate, tricresylphosphate, resorcinol bis(diphenylphosphate), and bisphenol A bis(diphenylphosphate);
- (xi) polytetrafluoroethylene present in an amount in a range of between about 0.1 wt % and about 1 wt %; and
- (xii) potassium perfluorobutanesulfonate present in an amount in a range of between about 0.05 wt % and about 0.2 wt %;

wherein all amounts are based on the weight of the entire composition, which comprises combining and mixing the components of the composition under conditions suitable for the formation of a blend of the components, and, optionally, then reducing the composition so formed to particulate form.

56. The method of claim 55 further comprising at least one core-shell impact modifier present in an amount in a range of between about 0.1 wt % and about 1 wt %, based on the weight of the entire composition, and comprising a poly(methylmethacrylate) shell.

* * * * *